United States Patent
Atsmon et al.

(10) Patent No.: US 10,504,073 B2
(45) Date of Patent: Dec. 10, 2019

(54) SYSTEM AND PROCESS FOR AUTOMATICALLY ANALYZING CURRENCY OBJECTS

(76) Inventors: Alon Atsmon, Qiryat Ono (IL); Dan Atsmon, Rehovot (IL)

(*) Notice: Subject to any disclaimer, the term of this patent is extended or adjusted under 35 U.S.C. 154(b) by 0 days.

(21) Appl. No.: 13/353,791

(22) Filed: Jan. 19, 2012

(65) Prior Publication Data

US 2012/0185393 A1    Jul. 19, 2012

Related U.S. Application Data

(60) Provisional application No. 61/438,993, filed on Feb. 3, 2011, provisional application No. 61/433,995, filed on Jan. 19, 2011, provisional application No. 61/548,267, filed on Oct. 18, 2011.

(51) Int. Cl.

| G06Q 20/10 | (2012.01) |
| G06Q 20/32 | (2012.01) |
| G06Q 20/38 | (2012.01) |
| G06Q 20/40 | (2012.01) |
| G06K 9/00 | (2006.01) |
| G07D 7/00 | (2016.01) |
| G07D 11/30 | (2019.01) |

(52) U.S. Cl.
CPC ............ G06Q 20/10 (2013.01); G06K 9/00 (2013.01); G06Q 20/3276 (2013.01); G06Q 20/389 (2013.01); G06Q 20/40 (2013.01); G07D 7/00 (2013.01); G07D 11/30 (2019.01)

(58) Field of Classification Search
USPC .......................................................... 705/44
See application file for complete search history.

(56) References Cited

U.S. PATENT DOCUMENTS

| 7,522,768 | B2 | 4/2009 | Bhatti et al. | |
| 7,526,117 | B2 | 4/2009 | Foth | |
| 2004/0210529 | A1 | 10/2004 | Wu | |
| 2005/0156942 | A1 | 7/2005 | Jones | |
| 2007/0255662 | A1 | 11/2007 | Tumminaro | |
| 2008/0046410 | A1 | 2/2008 | Lieb | |
| 2008/0219543 | A1* | 9/2008 | Csulits | G06K 9/033 382/135 |
| 2009/0252371 | A1 | 10/2009 | Rao | |

(Continued)

FOREIGN PATENT DOCUMENTS

| WO | WO 2004/027695 | 4/2004 |
| WO | WO/2006/022513 | 3/2006 |

(Continued)

*Primary Examiner* — Jason Borlinghaus
*Assistant Examiner* — Ambreen A. Alladin

(57) ABSTRACT

A method, system, and computer program product for analyzing images of visual objects, such as currency and/or payment cards, captured on a mobile device. The analysis allows determining the authenticity and/or total amount of value of the currency and/or payment cards. The system may be used to verify the authenticity of hard currency, to count the total amount of the currency captured in one or more images, and to convert the currency using real time monetary exchange rates. The mobile device may be used to verify the identity of a credit card user by analyzing one or more images of the card holder's face and/or card holder's signature, card holder's name on the card, card number, and/or card security code.

23 Claims, 4 Drawing Sheets

(56) References Cited

U.S. PATENT DOCUMENTS

| | | | |
|---|---|---|---|
| 2010/0008535 A1* | 1/2010 | Abulafia | G06K 9/2054 382/100 |
| 2010/0082470 A1* | 4/2010 | Walach | G06Q 20/0425 705/35 |
| 2010/0113091 A1* | 5/2010 | Sharma | G06K 9/4642 455/556.1 |
| 2010/0331043 A1* | 12/2010 | Chapman | G01C 21/20 455/556.1 |
| 2011/0091092 A1* | 4/2011 | Nepomniachtchi | G06K 9/3275 382/139 |
| 2011/0099107 A1 | 4/2011 | Saxena | |
| 2011/0119141 A1 | 5/2011 | Hoyos | |
| 2013/0022264 A1 | 1/2013 | Atsmon et al. | |

FOREIGN PATENT DOCUMENTS

| | | |
|---|---|---|
| WO | WO/2008/126937 | 10/2008 |
| WO | WO/2008/147896 | 12/2008 |
| WO | WO 2009/137830 | 11/2009 |
| WO | WO/2011/032263 | 3/2011 |
| WO | WO/2011/047034 | 4/2011 |

* cited by examiner

US 10,504,073 B2

SYSTEM AND PROCESS FOR AUTOMATICALLY ANALYZING CURRENCY OBJECTS

CROSS REFERENCE TO RELATED APPLICATION

The present application claims priority benefit under 35 U.S.C. § 119 (e) to U.S. Provisional Patent Application No. 61/433,995 filed Jan. 19, 2011 by Alon Atsmon, entitled "System and Process for Automatically Analyzing Currency Objects", No. 61/438,993 filed Feb. 3, 2011 by Alon Atsmon, entitled "System and Process for Automatically Analyzing Currency Objects", and No. 61/548,267 filed Oct. 18, 2011 by Alon Atsmon, entitled "Automatic Method and System for Visual Analysis of Object Against Preset". The present application incorporates the foregoing disclosures herein by reference.

BACKGROUND

1. Technical Field

The present invention relates to systems and processes for automatically analyzing currency objects.

2. Discussion of the Related Art

The prior art discloses methods for utilizing mobile communications devices to process a credit card or debit card payment. For example, Square, Inc. offers credit card readers that are connected to a mobile device. (See WIPO Patent Application WO/2011/047034). The card reader is configured to read data encoded in a magnetic strip of a credit card and provide a signal that corresponds to the data read to the mobile device, which then decodes the incoming signal from the card reader and acts as a point-of-sale device to complete the financial transaction.

The prior art also discloses the use of mobile devices to verify the identity of customers. For example, Siccolla, Inc. offers a mobile device with an identity verification tool built-in (See United States Patent Application 20110119141). The wireless phone has a specialized built-in fingerprint sensor, camera(s), and blood sensor to acquire images of biometrics to perform identity verification in order to prevent identity theft and financial fraud during commercial transactions.

Both of these products require hardware modification of the mobile device. The prior art also fails to provide a computer program product and system for use with a mobile device that does not require a hardware modification of the device in order to: 1) verify the user of a payment card for the purpose of preventing identify theft, and 2) verify that cash payments are not used with counterfeit currency. Nor does the prior art provide a mobile device that combines fraud prevention using instantaneous imaging processing of hard currency captured on a device's camera or web-cam, with the ability to count the amount of the currency in an image, and to convert the amount to another currency using monetary exchange rates in real time.

BRIEF SUMMARY

The present invention provides a method, system, and computer program product for analyzing images of an object (money, credit cards, etc.) captured on an electronic communications device (terminal), such as a mobile phone camera or laptop web-cam, to quantify their face value, and optionally to determine if they are authenticate—not counterfeit or stolen cards. The method of the present invention may further comprise converting the currency in each image to another monetary currency based on real time world exchange rates. The conversion is preset by the terminal user, the mobile device provider, and/or automatically by the device based upon location based analysis.

The method comprises: capturing a visual object image on a terminal, wherein each image is associated with a particular object of known authenticity; conducting a content analysis on the captured image; determining the quantity and authenticity of the captured object based on the content match, wherein a match exists if the content analysis is above a designated threshold for authenticity; and transmitting an electronic report to the terminal indicating the content match.

Content analysis is conducted using keypoint descriptors as defined herein, and further comprises comparing the image's captured text, visual and symbol data, and optionally other data such as GPS data, the history of the sender and a database of known fake visual objects. Additionally, the digital images are captured with an electronic communications device (i.e. terminal); to include using terminals with a predefined array of cameras to construct a three dimensional (3D) representation of the object.

In a preferred embodiment of the present invention, a user makes a pending deposit to their financial institution by transmitting an image of cash or checks captured on their terminal to their institution account. They subsequently visit the institution to make the actual deposit, wherein the teller will validate the amount and authenticity of the deposit before converting the pending deposit to a fully credited deposit.

In another preferred embodiment of the present invention, the authenticity of a card, such as a credit or debit card, is determined by capturing an image of the card on a User's terminal. An analysis of the card validity is based upon an image comprising the name on the card, an embossed credit card number, expiration date and CVV number and signature on the card. And in addition to capturing an image of the card, the User's electronic communications device can capture an image of a card holder's signature executed on the device's screen and a card holder's face and compare them to comparable images stored in the system database.

Other aspects of the invention may include a system arranged to execute the aforementioned methods and a computer readable program to include a mobile application configured to execute the aforementioned methods. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

The present invention will now be described in the following detailed description of exemplary embodiments of the invention and with reference to the attached drawings, in which dimensions of components and features shown are chosen for convenience and clarity of presentation and are not necessarily shown to scale. Generally, only structures, elements or parts that are germane to the discussion are shown in the figure.

DETAILED DESCRIPTION

Figure 1:
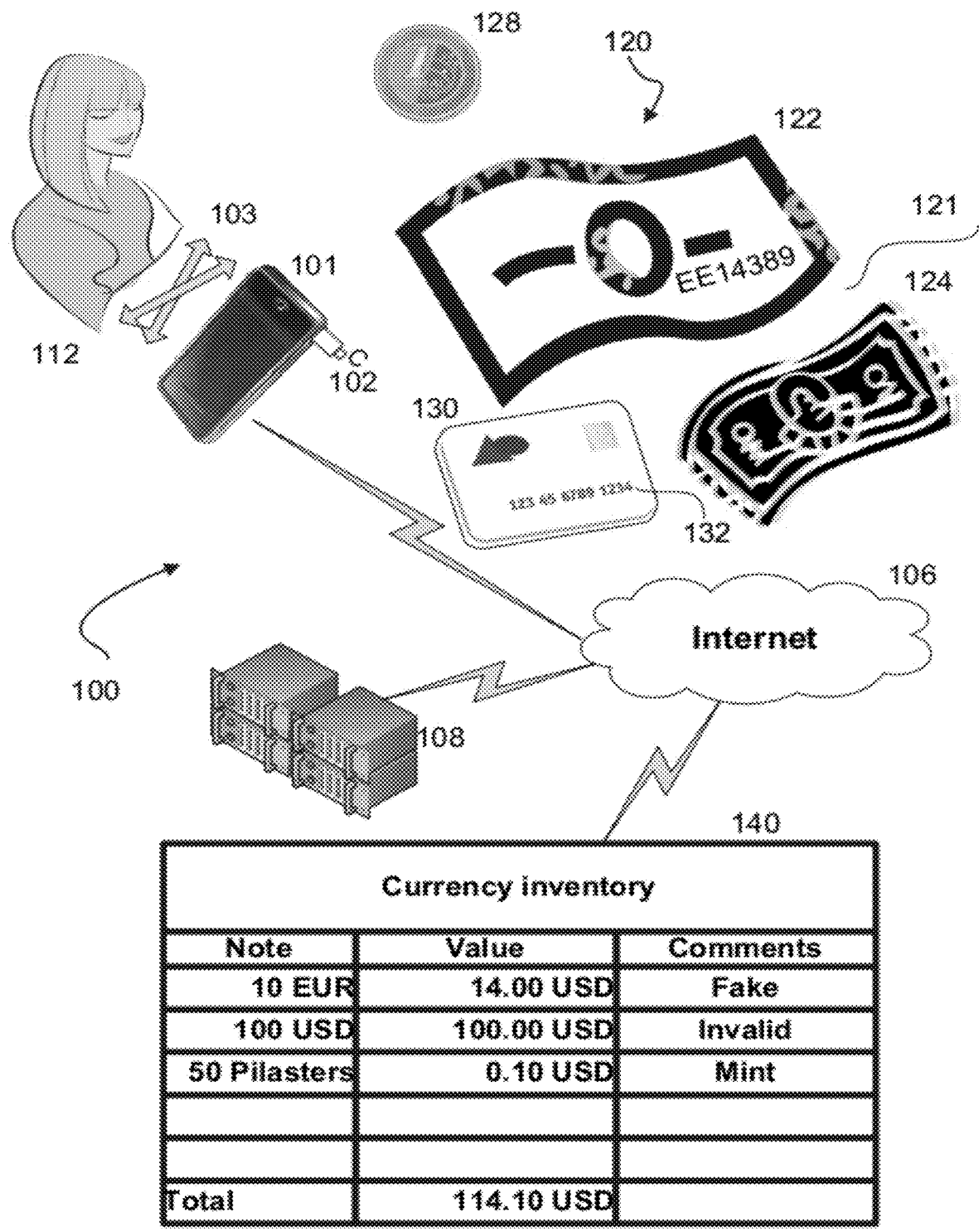
FIG. 1 is a scheme describing the system and process in accordance with an exemplary embodiment of the invention.

Provided herein is a detailed description of this invention. It is to be understood, however, that this invention may be embodied in various forms, and that the suggested (or proposed) embodiments are only possible implementations (or examples for a feasible embodiments, or materializations) of this invention. Therefore, specific details disclosed herein are not to be interpreted as limiting, but rather as a basis and/or principle for the claims, and/or as a representative basis for teaching one skilled in the art to employ this invention in virtually any appropriately detailed system, structure or manner.

Glossary of Terms

To facilitate understanding the present invention, the following glossary of terms is provided. It is to be noted that terms used in the specification but not included in this glossary are considered as defined according the normal usage of the computer science art, or alternatively according to normal dictionary usage.

The term "image" as used herein in this application is defined as visual representation that can be presented on two dimensional or three dimensional surfaces. Images can be taken in any part of the electromagnetic spectrum such as visible light, infrared, ultraviolet, X-rays, Terahertz, Microwaves, and Radio frequency waves.

The term "photo" as used herein in this application is defined as image in the visible light.

The term "GPS" as used herein in this application, is defined as a system based on satellites that allows a user with a receiver to determine precise coordinates for their location on the earth's surface.

The term "GPU" as used herein in this application, is defined as an apparatus adapted to reduce the time it takes to produce images on the computer screen by incorporating its own processor and memory, having more than 16 CPU cores, such as GeForce 8800.

The term "Keypoint" as used herein in this application, is defined as interest points in an object. For example, in the SIFT framework, the image is convolved with Gaussian filters at different scales, and then the difference of successive Gaussian-blurred images are taken. Keypoints are then taken as maxima/minima of the Difference of Gaussians. Such keypoint can be calculated for the original image or for a transformation of the original image such as an affine transform of the original images.

The term "Keypoint descriptor" as used herein in this application, is defined as a descriptor of a keypoint. For example, in the SIFT framework the feature descriptor is computed as a set of orientation histograms on neighborhoods. The orientation histograms are relative to the keypoint orientation and the orientation data comes from the Gaussian image closest in scale to the keypoint's scale. Just like before, the contribution of each pixel is weighted by the gradient magnitude, and by a Gaussian with σ 1.5 times the scale of the keypoint. Histograms contain 8 bins each, and each descriptor contains an array of 4 histograms around the keypoint. This leads to a SIFT feature vector with (4×4×8=128 elements).

The term "Visual content item" as used herein in this application, is defined as an object with visual characteristics such as an image file like BMP, JPG, JPEG, GIF, TIFF, and PNG files; a screenshot; a video file like AVI, MPG, MPEG, MOV, WMV, and FLV files or a one or more frame of a video.

The term "visual object" as used herein in this application, is defined as a content that includes visual information such as visual content item, images, photos, videos, IR image, magnified image, an image sequence or TV broadcast.

The term "currency object" as used herein in this application, is defined as a physical object having monetary value such as paper money, coin, medal, share certificate and bonds.

The term "camera" as used herein in this application is defined as means of capturing a visual object.

The term "terminal" as used herein in this application is defined as an apparatus adapted to show visual content such as a computer, a laptop computer, mobile phone or a TV.

The term "visual similarity" as used herein in this application, is defined as the measure of resemblances between two visual objects that can be comprised of:

The fit between their color distributions such as the correlation between their HSV color histograms The fit between their texture The fit between their shapes The correlation between their edge histograms Face similarity Methods that include local descriptors (such as keypoint descriptors) and such as SIFT, ASIFT, SURF and MSR The term "Visual analysis" as used herein in this application, is defined as the analysis of the characteristics of visual objects such, as visual similarity, coherence, hierarchical organization, concept load or density, feature extraction and noise removal.

The term "Text similarity" as used herein in this application, is defined as a measure of the pair-wise similarity of strings. Text similarity can score the overlaps found between two strings based on text matching. Identical strings will have a score of 100% while "car" and "dogs" will have close to zero score. "Nike Air max blue" and "Nike Air max red" will have a score which is between the two.

The term "Regular expression" as used herein in this application, is defined as a string that provides a concise and flexible means for identifying strings of text of interest, such as particular characters, words, or patterns of characters.

The term "Text analysis" as used herein in this application, is defined as the analysis of the structural characteristics of text, as text similarity, coherence, hierarchical organization, concept load or density. Text analysis can use regular expressions.

The term "OCR" as used herein in this application, is defined is the process by which a computer attempts to match up parts of an electronic image, with characters, such as letters, to produce text.

The term "Symbol analysis" as used herein in this application, is defined as analysis of symbolic data such as: OCR, hand write recognition, barcode recognition, and QR code recognition.

The term "Capturing data analysis" as used herein in this application, is defined as the analysis of capturing data such as:

X-Y-Z coordinates
3 angles
Manufacturer
Model
Orientation (rotation) top-left
Software
Date and Time
YCbCr Positioning centered
Compression
x-Resolution
y-Resolution
Resolution Unit
Exposure Time
FNumber
ExposureProgram
Exif Version
Date and Time (original)
Date and Time (digitized)
ComponentsConfiguration Y Cb Cr—
Compressed Bits per Pixel
Exposure Bias
MaxApertureValue
Metering Mode Pattern
Flash fired or not
Focal Length
MakerNote
FlashPixVersion
Color Space
PixelXDimension
PixelYDimension
File Source
InteroperabilityIndex
InteroperabilityVersion
Derivates of the above such as acceleration in the X-axis The term "Service location" as used herein in this application, is defined as a physical place where objects can be serviced and/or fixed such as a mobile carrier service center.

The term "Location based analysis" as used herein in this application, is defined as analysis of local data such as GPS location, triangulation data, RFID data, and street address. Location data can for example identify the service location or even the specific part of the service location in which the visual object was captured.

The term "Content analysis" as used herein in this application, is defined as the combination of text analysis, visual analysis, symbol analysis, location based analysis, capturing data analysis and/or analysis of other data such as numerical fields (price range), date fields, logical fields (Female/male), arrays and structures, and analysis history.

The term "Content Match" as used herein in this application, is defined as a numerical value that describes the results of the content analysis that computes the similarity between one or more visual objects, or a logical value that is true in case said similarity is above a certain threshold.

The term "marketplace" as used herein in this application, is defined as a physical place where objects can be bought such as a bank, a change point, a supermarket, a convenience store and a grocery store.

The term "Bank" as used herein in this application, is defined as a financial institution that accepts deposits.

The term "Payment Card" as used herein in this application, is defined as a Card used to make payments such as a debit card, a credit card or a loyalty card.

The term "SN" as used herein in this application, is defined as a collection of letters, numbers and symbols printed on a currency object in order to identify it uniquely.

System for Analyzing Images

FIG. 1 is a scheme describing the system 100 and process in accordance with an exemplary embodiment of the present invention for use in verifying that a form of payment (i.e. currency and payment card) is valid and to count the amount in an automated manner.

Terminal 101, such as a mobile phone with camera 102, captures a visual object, of object set 120 comprising paper money bills 122, 124 and coin 128.

Optionally, object set 120 includes payment card 130 having visual details 132 such as embossed credit card number, expiration date and CVV number and card holder name. Optionally, the owner of 132 also signs its name on terminal 101 or upon deal confirmation.

The Capturing can be performed in several ways: 1) taking a photograph; 2) recording a video; and 3) Continuously capturing an image while local or remote processing provides real time feedback such "currency not fake" or "a problem was found". The continuous capturing can be done while moving the camera such as moving in the directions shown in 103.

The visual object can be captured from a static camera placed in the marketplace or from a camera held by person 112. Person 112 can be a crowd of people that were incentivized to capture the currency object. The visual objects 120 comprise recognized world currencies, such as a Euro Note 122 and U.S. bill 124, and coins 128. The paper currency 122, 124 may also comprise SN 121, which are unique identifiers—letters, numbers, threads and symbols—used to authenticate the validity of a currency, and deter counterfeits.

Figure 2:
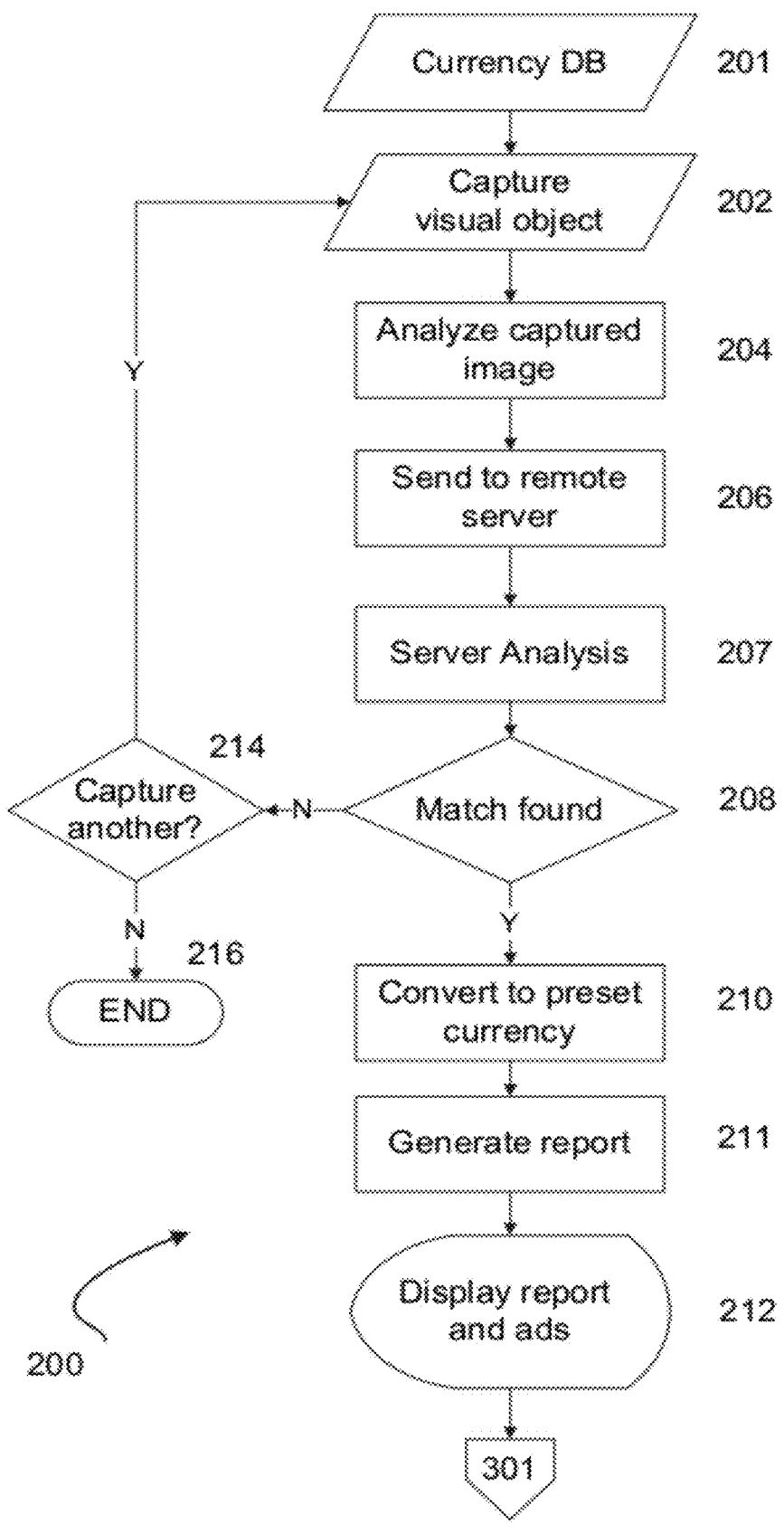
FIG. 2 is a flowchart of acts performed in capturing and matching a visual object, in accordance with an exemplary embodiment of the invention.

The visual object can be processed locally using the User's terminal 101, or it can be sent to a remote server 108, as described in step 206 in FIG. 2, over a network 106 such as the internet.

Server 108 or device 101 calculates a currency inventory report 140 that is sent over the internet or created locally. Report 140 shows the currency object identity found, their value in a preset conversion currency and the total value found in the capturing session.

A usage case would be that a person takes a photo of 100 euro note 122 with his mobile device 101. The photo is sent to a remote server 108 that uses a currency objects database to match the objects photographed. Then a currency inventory report 140 is displayed on device 101.

Terminal 101 can also capture a visual object 120 comprising a payment card 130 having visual details 132, such as embossed credit card number, expiration date and CVV number and card holder name. Optionally, in addition to capturing an image of the card, terminal 101 can also capture the card holder's signature executed on the terminal 101's screen (graphical interface) and optionally an image of the card holder's face and submit them to the server to verify the card holder is the card owner of record.

Mobile Application

The present invention further comprises a software application loaded onto the User's terminal 101 (e.g. a mobile communications device, such as a smartphone) configured to communicate with the system server 108, such as over a wireless communications network. The application may be native or web based. The User's device enables the User to instantly transmit an image of the visual object 120 to the system server 108, and to receive notifications from the system server 108 with the report of the image analysis. The terminal 101 of the present invention may further comprise image capture and processing modules that enable the User to locally analyze the image and produce a report without having to electronically communicate with the system server 108.

Method of Capturing and Matching a Visual Object

FIG. 2 is a flowchart of acts performed in capturing and matching a visual object, in accordance with an exemplary embodiment of the invention. The flowchart describes a process and system 200 to capture and match visual objects.

A Currency object database 201 is loaded, which includes photos of a plurality of currency objects from one or more sides, such as both sides of hard currency (i.e. paper currency and coins). The image of a visual object 120 is then captured in step 202 with the terminal device 101. Optionally, the object is captured by two or more cameras, thus constructing a three dimensional (3D) representation of the object.

Captured object image as mentioned in step 202 is optionally analyzed locally in step 204, as further described in step 207, to get a match using content analysis or to reduce the size of the data to be sent to local or remote servers in step 206.

Optionally the image itself or a processed part of it is sent in step 206 to a remote server 108 or locally processed on a server at device 101. The server performs server content analysis 207 to generate a report 140. Such analysis optionally uses the visual object size estimation of the coin and/or bank note based on its 3D representation, and optionally other data such as GPS data, the history of the sender and a database of known fake visual objects. Object's actual volume (e.g. size, area) is estimated by performing an interline calculation between two registered images and using a known distance between camera lens in camera array. The estimated volume is used to aid in the database currency search process, and to validate object's authenticity.

In case predefined criteria are met, such as a match to predefined database currency object is found 208, then step 210 is performed to convert the currency object to a preset currency. Preset currency can be set manually by the user, by its carrier, or by an operation location based analysis on capturing location data such as geo-tagging. A report such as 140 is then generated 211 and displayed 212 using an electronics communication device 101, such as a smart phone. Optionally commercial ads are displayed 212 on device 101, such as ads for a nearby currency exchange place or a bank.

Optionally steps 204 and/or 207 further comprise recognition of the SN 121, such as OCR and further measures against fake SN's or fake SN/currency value combinations. Optionally execution is passed to the step 301 further described in FIG. 3.

In a particular exemplification, report 140 provides the amount of the currency in the original image, the amount of the currency after being converted to the designated type, and whether the currency is authenticate. The system can also sum the amounts of currency in multiple images as selected by the User. The images may be sequential or non-sequential wherein the User selects which image files to analyze together in one report. See Table 140 in FIG. 1 for an example of a report 212 generated for three images, wherein each image is of a different type of currency that are all converted to the same type of currency (i.e. US). The report also provides a "Comments" section that details the authenticity of the currency in each image. Lastly, the report will provide a sum of the total amount of all the currencies successfully analyzed in the different images, wherein the sum is in the converted currency.

In case no match is found in step 208, a check is done whether another capturing 214 should be performed. The check can be with the User of terminal 101 using his/her device's camera, or check against a timer which allows taking images for up to a predefined time. In case check results are positive, then step 202 is performed again, if not then the process ends 216.

System and Method of Validating Cash Deposits to Banks

Figure 3:
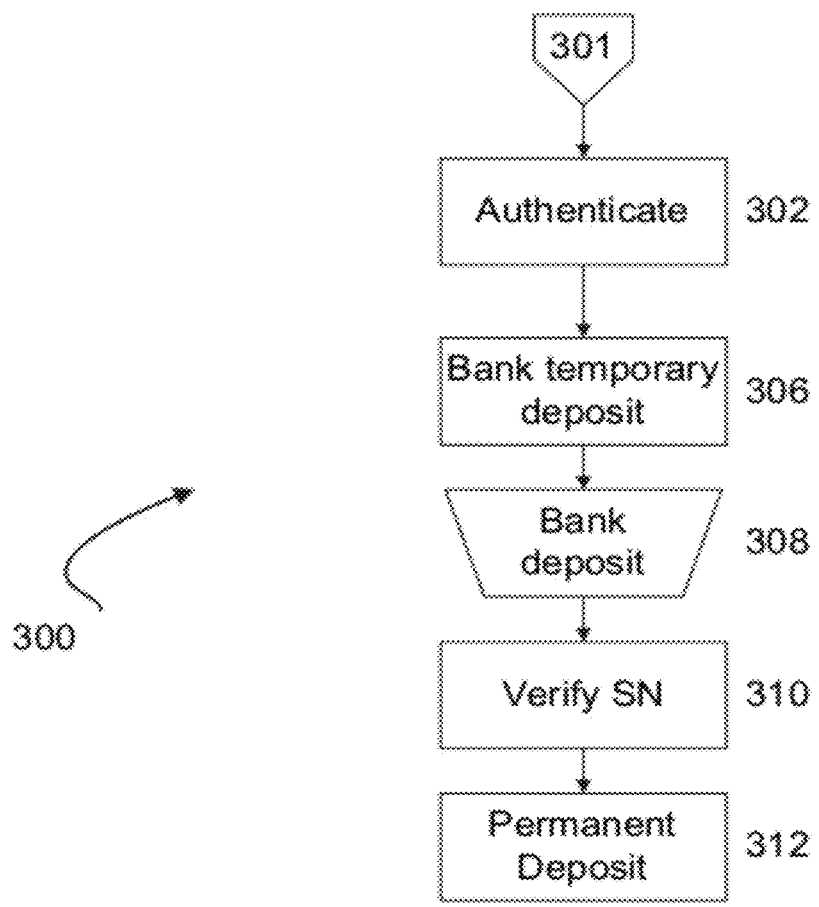
FIG. 3 is a flowchart of acts performed in accordance with an exemplary embodiment of the invention to make a band deposit.

FIG. 3 is a flowchart of acts performed in capturing and matching a visual object, in accordance with an exemplary embodiment of the invention for validating the authenticity of cash deposits to banks, either to a bank teller or to an ATM machine. System 300 performs the process described hereinafter:

The Currency objects 120 are authenticated in step 302 using methods such as checking their SN comprising: exposing them to an adequate lighting source such as sunlight in order to enable good capturing of a paper money watermark; using an Ultraviolet or Infrared light in order to read UV/IR signs; and using a magnetic sensor in order to conduct a magnetic reading of the currency object.

The total sum of the currency object is deposited in step 306 in a bank account temporarily before the currency objects are physically handed to the bank. The bank can credit the account holder in all or a part of the sum (for example 99% as past cases indicate 1% of the currency object are fake or will not be physically deposited).

The currency objects are later deposited in step 308 physically in the bank. Optionally the SN's of the visual object are compared in step 310 to those received in step 306 using the SN's in the original visual object so as to verify the original deposit. Subsequent to that, part or all of the temporary deposit turns into a permanent deposit 312.

Figure 4:
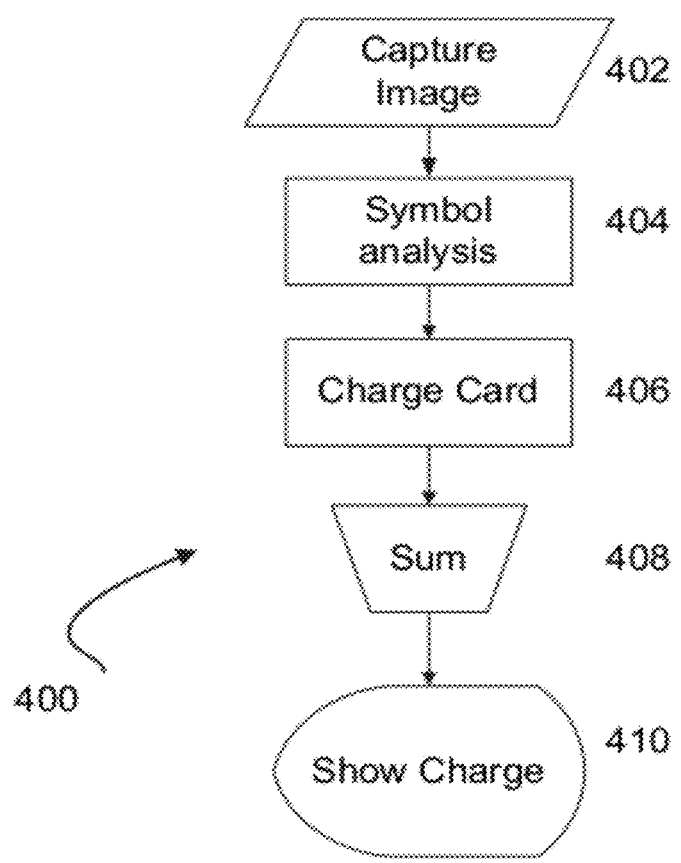
FIG. 4 is a flowchart of acts performed in accordance with an exemplary embodiment of the invention to charge a credit card.

FIG. 4 is a flowchart of acts performed in capturing and matching a visual object, in accordance with an exemplary embodiment of the invention. System 400 performs the process described hereinafter:

The visual object of payment card 130 is captured in step 402 using an electronic communications device 101 with camera 102 and/or video capacity. Symbol analysis is then performed in step 404 on the visual object to produce a text such as the visual details of the credit card 132. The text is used to charge the payment card in step 406 with an amount 408 that is entered into the electronics communications device 101. The transaction can further be authenticated using an image of the card owner's signature, his face, or letting him type his PIN number on device 101. Optionally a charge report 410 is displayed on device 101.

EXEMPLIFICATIONS

Example 1—Merchant Receiving Payment in Paper Money of a Foreign Currency

An exemplification of the present invention, especially that as disclosed in FIG. 1 and FIG. 2, comprises a merchant who receives payment for goods or services that they have provided to a customer who is paying in paper money and coins.

The merchant can capture an image of the currency on their electronic communications device at the time of payment. For example, a store cashier with a computer such as a laptop, netbook, etc., or a waitress in a restaurant with a mobile communications device can capture an image of the customer's currency. After the merchant captures the image, the system will indicate if the image is a match with images of major world currencies stored in the system database. If the image is not a match, it is because the image may not be clear enough to make the match, and/or it may indicate the currency is a counterfeit. The merchant can elect to re-verify by capturing the image again, and repeating the match. The merchant may then instantly convert it to another currency if required, and/or sum the total amount of payment by the customer. The match and currency conversion analysis is accomplished instantaneously through either the software installed on the merchant's terminal (i.e. electronic device) and/or by the merchant transmitting the images via an Internet connection to a local or remote system server and then electronically receiving a report of the analysis. The merchant then views the report of the analysis on their electronic communications device and processes the customer's payment in accordance with the report. For example, the merchant may decline the payment and request additional payment if the currency is found to be counterfeit. Or the merchant may request additional payment if the current exchange rate indicates that the amount of payment is not enough.

Example 2—Making a Cash Bank Deposit

The present invention may also be used in making a cash deposit to a financial institution as illustrated in FIG. 3, wherein the bank customer temporarily credits their account (i.e. pending) by electronically transmitting an image of the deposit before visiting the bank and making the actual deposit. The customer would capture an image of the bills s/he is depositing using their mobile device camera. The mobile device would have software, or access to an Internet connection to the system server for completing the image capture, analysis, and reporting of the present invention. They would then log into their bank account via the Internet and be authenticated by the bank's system (302); and upload the image of their deposit into their online account. The institution will indicate in its electronic records that a temporary deposit 306 (i.e. pending credit) has been made at the time that the image is received. The bank customer will subsequently visit the bank within a set time period as determined by bank rules for time limitations to process pending deposits. When the customer makes the actual deposit at the bank, the institution will then indicate that an actual deposit 308 was made. Additionally, the bank may utilize the software/system of the present invention to determine if the actual deposit 308 is counterfeit. If the authenticity of the hard currency is verified by analyzing the captured image of the currency 310 or by other means known in the banking industry (i.e. teller physically checking), then the deposit is designated as permanent in the customer's account 312. If the currency is found not to be authentic or the customer does not make the actual physical deposit at the bank (308), then the customer is notified of such, and the pending state of the deposit is dropped from the customer's account so that no credit is given for the deposit.

Example 3—Merchant Processing a Payment Card

A merchant receives payment for goods or services that they have provided to a customer who is paying using a credit or a debit or a loyalty card. The merchant can capture an image of the card on their electronic communications device at the time of payment and extra the text (i.e. card number) for electronically submitting a charge to the card from the mobile device. For example, a store cashier with a computer such as a laptop, netbook, etc., or a waitress in a restaurant with a mobile communications device can capture an image of the customer's card, front and back, wherein the image comprises the card holder's name, the card number, the signature, and the three digit security code CSC (also known as a CCID or Credit Card ID or Card Verification Value (CVV or CVV2)). The merchant can also take an image of the customer's face using his electronic device, wherein he transmits the images to a local or remote server for comparison and analysis to stored images of the card holder's signature and/or photograph. The merchant will then receive a report on his electronic communications device verifying that the customer is the true owner of the card, thus enabling him to process the payment.

Computer Program

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What claimed is:

1. A system for conducting a content analysis of an image depicting a plurality of currency objects, the system comprising a server in network communication with a mobile device, the server comprising:
   a hardware processor;
   a non-transitory computer readable medium having embodied thereon code instructions that in response to execution by a hardware processor of the server, cause the server to:
   receive over a network, a single image captured by at least one camera of the mobile device, the single image depicting at least one currency object of each of a plurality of types of currency objects denoting respective denominations of major world currencies, and location data indicative of location of the mobile device computed by a location based analysis of output of a location data sensor;
   conduct a content analysis of the single image, wherein said content analysis comprises:
      identifying each of the plurality of types of currency objects,
      computing a plurality of keypoint descriptors as a set of orientation histograms on neighboring pixels of said plurality of types of currency objects;
      convoluting the captured image with Gaussian filters at different scales to create a plurality of successive Gaussian-blurred images;
      wherein the orientation histograms are relative to the orientation of the plurality of keypoints, wherein the orientation data for the orientation histograms is derived from the Gaussian image closest in scale to the scale of each respective keypoint of the plurality of keypoints;
      computing a quantity of each currency object of the plurality of types of currency objects;
   convert each of the plurality of identified types of currency objects to a common monetary currency in use at the location of the mobile device;
   create a currency inventory report comprising a total monetary value of the plurality of types of currency objects when converted to the common monetary currency; and
   transmit from the server over the network to said mobile device, the currency inventory report for presentation on a display of said mobile device.

2. The system of claim 1, wherein said content analysis further comprises an analysis of a member selected from a group consisting of the image's captured text, visual and symbol data from said captured image, a history of images captured using said mobile device and at least one currency object from a database of known fake currency objects.

3. The system of claim 1, wherein said content analysis further comprises:
   calculating a face value of the plurality of types of currency objects, and
   calculating a total value by summing the value of each of said plurality of types of currency objects.

4. The system of claim 1, wherein said at least one camera comprises an array of cameras of said mobile device and wherein said capturing is conducted to construct a three dimensional (3D) representation of said plurality of types of currency objects.

5. The system of claim 1, wherein said content analysis comprises performing an authentication of each currency object of said plurality of types of currency objects.

6. A computer implemented method for utilizing a mobile device to analyze the authenticity and monetary value of currency deposited into a bank account, the method performed by a server in network communication with the mobile device, comprising:
   a) receiving by the server over a network, a single image captured by at least one camera of the mobile device, the single image depicting at least one currency object of each of a plurality of types of currency objects denoting respective denominations of major world currencies, and location data indicative of location of the mobile device computed by a location based analysis of output of a location data sensor;
   b) conducting by the server a content analysis of said single image, wherein said analysis comprises:
      identifying each of the plurality of types of currency objects,
      computing a plurality of keypoint descriptors as a set of orientation histograms on neighboring pixels of said plurality of types of currency objects;
      convoluting the captured image with Gaussian filters at different scales to create a plurality of successive Gaussian-blurred images;
      wherein the orientation histograms are relative to the orientation of the plurality of keypoints, wherein the orientation data for the orientation histograms is derived from the Gaussian image closest in scale to the scale of each respective keypoint of the plurality of keypoints;
      computing a quantity of each currency object of the plurality of types of currency objects;
   c) converting each of the plurality of identified types of currency objects to a common monetary currency in use at the location of the mobile device;
   d) calculating a total monetary value of the plurality of types of currency objects when converted to the common monetary currency;
   e) temporarily depositing the total monetary value into a user's bank account according to the common monetary currency; and
   f) authenticating the plurality of currency objects after receiving an indication of a physical deposit of the plurality of currency objects in the user's bank to convert the temporarily deposited monetary value to a permanent deposit.

7. The method of claim 6, wherein said verifying is performed by utilizing light to check for watermarks and UV or signs.

8. The method of claim 6, wherein said content analysis further comprises an analysis of a member selected from a group consisting of the image's captured text, currency and symbol data from said captured image, a history of images captured using said mobile device and at least one currency object from a database of known fake currency objects.

9. The method of claim 6, wherein said content analysis further comprises calculating the value of the plurality of types of currency objects in said image by summing the value of each of said plurality of types of currency objects in said image.

10. The method of claim 6, wherein said at least one camera comprises an array of cameras of said mobile device and wherein said capturing is conducted to construct a three dimensional (3D) representation of said plurality of types of currency objects.

11. A non-transitory computer readable medium having embodied thereon code instructions that, when executed by one or more hardware processors of a server in network communication with at least one mobile device, cause the one or more hardware processors of the server to:
 a) receive a single image captured using at least one camera of the mobile device, the single image comprising at least one currency object of each of a plurality of types of currency objects denoting respective denominations of major world currencies, and location data indicative of location of the mobile device computed by a location based analysis of output of a location data sensor;
 b) conduct a content analysis of the single image, wherein said content analysis comprises:
  identifying each of the plurality of types of currency objects;
  computing a plurality of keypoint descriptors as a set of orientation histograms on neighboring pixels of said plurality of types of currency objects;
  convoluting the captured image with Gaussian filters at different scales to create a plurality of successive Gaussian-blurred images;
  wherein the orientation histograms are relative to the orientation of the plurality of keypoints, wherein the orientation data for the orientation histograms is derived from the Gaussian image closest in scale to the scale of each respective keypoint of the plurality of keypoints;
  computing a quantity of each currency object of the plurality of types of currency objects;
 c) convert each of the plurality of identified types of currency objects to a common monetary currency in use at the location of the mobile device;
 d) create a currency inventory report comprising a total monetary value of the plurality of types of currency objects when converted to the common monetary currency; and
 e) transmit to said mobile device, the currency inventory report for presentation on a display of said mobile device.

12. The non-transitory computer readable medium of claim 11, wherein said content analysis further comprises an analysis of a member selected from a group consisting of the image's captured text, visual and symbol data from said captured image, a history of images captured using said mobile device and at least one currency object from a database of known fake currency objects.

13. The non-transitory computer readable medium of claim 11, wherein said conducting further comprises:
 calculating a face value of the plurality of types of currency objects, and
 calculating a total value by summing the value of each of said plurality of types of currency objects.

14. The non-transitory computer readable medium of claim 11, wherein said at least one camera comprises an array of cameras of said mobile device and wherein said capturing is conducted to construct a three dimensional (3D) representation of said plurality of types of currency objects.

15. The non-transitory computer readable medium of claim 11, wherein said content analysis comprises performing an authentication of each currency object of said plurality of types of currency objects.

16. The non-transitory computer readable medium of claim 11, wherein said content analysis further comprises comparing differences and similarities between at least one reference image object of a reference image and said image.

17. An internet based system for quantifying and analyzing the authenticity of a plurality of types of currency objects, the system comprising:
 a mobile device comprising:
  at least one hardware processor;
  a non-transitory computer readable medium having embodied thereon code instructions that in response to execution by the at least one hardware processor of the mobile device, cause the mobile device to:
   capture a single image that images at least one currency object of each of a plurality of types of currency objects denoting respective denominations of major world currencies, using a camera or a video recorder of a respective said mobile device, and provide location data indicative of location of the mobile device computed by a location based analysis of output of a location data sensor;
 a database storing a plurality of reference denominations of major world currencies;
 a processor;
 non-transitory storage coupled to the processor and storing code that, when executed by the processor, cause the processor to:
 apply a decision function to the plurality of types of currency objects to yield an analysis of authenticity of each member of said type of currency object according to a match with said plurality of denominations of major world currencies, wherein a match exists when the decision function is above a designated threshold for authenticity;
 wherein the decision function comprises:
  identifying each of the plurality of types of currency objects,
  computing a plurality of keypoint descriptors as a set of orientation histograms on neighboring pixels of said plurality of types of currency objects;
  convoluting the captured image with Gaussian filters at different scales to create a plurality of successive Gaussian-blurred images;
  wherein the orientation histograms are relative to the orientation of the plurality of keypoints, wherein the orientation data for the orientation histograms is derived from the Gaussian image closest in scale to the scale of each respective keypoint of the plurality of keypoints;
  computing a quantity of each currency object of the plurality of types of currency objects;
 convert each of the plurality of identified types of currency objects to a common monetary currency in use at the location of the mobile device;
 create a currency inventory report comprising a total monetary value of the plurality of types of currency objects when converted to the common monetary currency; and
 generate a currency inventory report and transmit said currency inventory report to said user mobile device for presentation on a display of said mobile device.

18. The system of claim 17, wherein said content analysis further includes determining the authenticity of each currency object of said plurality of types of currency objects based on a content match, wherein said match exists when the content analysis is above a designated threshold for authenticity.

19. The system of claim 17 wherein said plurality of types of currency objects comprises a payment card.

20. The system of claim 1, wherein said plurality of types currency objects include a plurality of types of coins, and said content analysis identifies said plurality of types of coins.

21. The system of claim 1, wherein computing the plurality of keypoints comprises computing the plurality of keypoints as maxima and minima of the differences of the successive Gaussian-blurred images.

22. The system of claim 1, wherein said currency inventory report is presented on said display of said mobile device at the same time as said single image.

23. The system of claim 1, wherein the currency inventory report in the common monetary currency is generated in real time, according to a real time location of the mobile device computed based on said output of the location data sensor and based on the single image captured in real time by the camera of the mobile device.

* * * * *